(12) United States Patent
Kabat et al.

(10) Patent No.: US 6,446,616 B1
(45) Date of Patent: Sep. 10, 2002

(54) VENT SYSTEM FOR GASEOUS FUELED VEHICLE

(75) Inventors: Daniel Michael Kabat, Oxford; Lowell Allan Reams, Plymouth; Robert Jay Natkin, Canton, all of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/682,949

(22) Filed: Nov. 2, 2001

(51) Int. Cl.[7] .......................... F02B 43/00; F02M 21/04
(52) U.S. Cl. .................. 123/527; 123/DIG. 12
(58) Field of Search ................. 123/525, 527, 123/529, 198 D, 3, DIG. 12

(56) References Cited

U.S. PATENT DOCUMENTS

| | | | |
|---|---|---|---|
| 3,762,175 A | 10/1973 | Jones | |
| 3,789,820 A | 2/1974 | Douglas et al. | |
| 4,364,364 A | * 12/1982 | Subramaniam | 123/527 |
| 4,513,728 A | * 4/1985 | Ullaman et al. | 123/527 |
| 4,587,986 A | * 5/1986 | Ullman et al. | 137/1 |
| 5,329,908 A | * 7/1994 | Tarr et al. | 123/527 |
| 5,361,742 A | 11/1994 | Briggs et al. | |
| 5,373,700 A | 12/1994 | McIntosh | |
| 5,611,316 A | * 3/1997 | Oshima et al. | 123/494 |
| 5,623,907 A | 4/1997 | Cotton et al. | |
| 5,868,121 A | 2/1999 | Brown et al. | |
| 6,041,762 A | * 3/2000 | Sirosh et al. | 123/529 |

* cited by examiner

Primary Examiner—Thomas N. Moulis

(57) ABSTRACT

A ventilation system (11) is provided to prevent the buildup of gaseous fuel within the vehicle upon degradation of the performance of the various parts within the fuel distribution system. The vehicle (10) has a combustible gas fuel source within the vehicle. The ventilation system includes a fuel line (28) coupling the engine (18) and the gas source. A vent line (30) is coupled to a vent. A pressure regulator (56) and pressure relief valve (60) are coupled between fuel line (28) and vent line. When either or both the pressure regulator (56) or relief valve (60) become inoperable, gaseous fuel is coupled to the vent line.

14 Claims, 2 Drawing Sheets

VENT SYSTEM FOR GASEOUS FUELED VEHICLE

CROSS REFERENCE TO RELATED APPLICATIONS

The present invention is related to application Ser. No. 09/682,951 entitled "Compartment Venting For Gaseous Fueled Vehicle" filed simultaneously herewith and incorporated by reference herein.

BACKGROUND OF INVENTION

1. Technical Field

The present invention relates generally to combustible gaseous fuel powered vehicles, and more specifically, to a method and apparatus for ventilating the vehicle to prevent the build-up of the gaseous fuel therein.

2. Background

Liquid gasoline is the most commonly used fuel source for internal combustion engines for automotive vehicles. Liquid gasoline has a high volumetric density of energy and therefore may be easily transported. Automakers are increasingly investigating alternative sources for powering internal combustion engines, propane, natural gas and hydrogen.

One fuel increasingly being investigated is hydrogen fuel. Hydrogen fuel is lighter than air. Various components such as relief valves and pressure regulators are used in such system. If a hydrogen fuel leak occurs in these components, hydrogen can build up in the various compartments within the vehicle.

It would therefore be desirable to prevent the buildup of hydrogen or other gaseous fuel within the vehicle.

SUMMARY OF INVENTION

The present invention provides a ventilation system to prevent the buildup of gaseous fuel within the vehicle upon degradation of the performance of the various parts within the fuel distribution system. The vehicle system has a combustible gas fuel source within the vehicle. The ventilation system includes a fuel line coupling the engine and the gas source. A vent line is coupled to a vent. A pressure regulator and pressure relief valve are coupled between fuel line and vent line. An emergency vent line is attached to the pressure regulator (at the atmospheric vent hole), pressure relief valve and further down stream to an emergency burst disc. If the regulator fails, the high-pressure gas will vent from the atmospheric vent hole, through the vent line to the external vent. If the emergency vent hole becomes blocked, the down stream high-pressure by-pass valve would vent of excess pressure through the emergency vent line to the external vent. If both the regulator vent and by-pass vent were to fail, the downstream burst disc would relieve the excess pressure to the emergency vent line and external vent.

In a further aspect of the invention, a method for operating a ventilation system for an automotive vehicle comprises:
  coupling a gaseous fuel storage tank to a fuel line;
  providing a regulator coupled between the fuel line and a vent line;
  providing a pressure relief valve coupled between the fuel line and a vent line; and
  upon inoperability of either the regulator or pressure relief valve, coupling gaseous fuel to said vent line.

One advantage of the invention is that the system may be coupled to various components within the fuel system.

Other advantages and features of the present invention will become apparent when viewed in light of the detailed description of the preferred embodiment when taken in conjunction with the attached drawings and appended claims.

DETAILED DESCRIPTION

Figure 1:
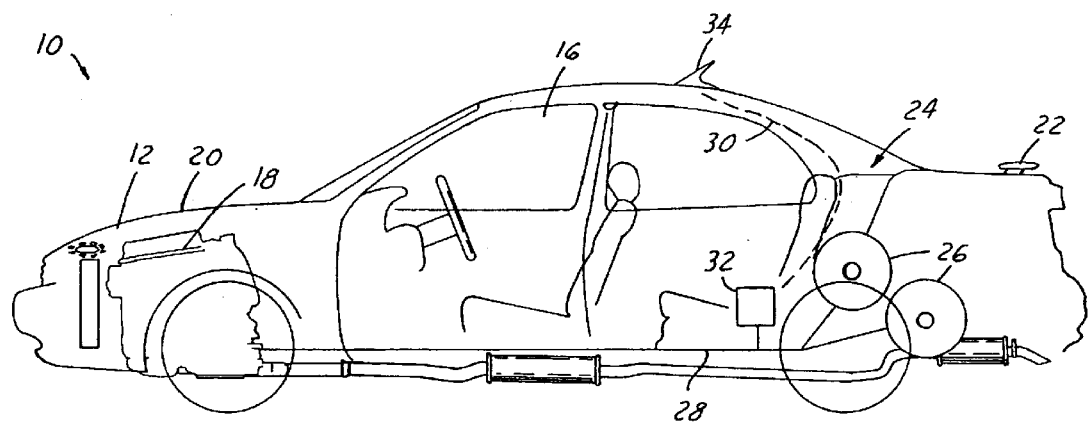
FIG. 1 is a partial cutaway view of a gaseous powered automotive vehicle having a ventilation system according to the present invention.

In the following figures the same reference numerals are used to identify the same components. The following description is described with respect to a hydrogen-powered vehicle. However, the present invention is applicable to other types of gaseous powered vehicles. The following description pertains to the inoperability of various fuel system components. In this application inoperability refers to a partial or full operability wherein gaseous fuel may bypass the device.

Referring now to the FIG. 1, an automotive vehicle 10 is illustrated having an engine compartment 12, a passenger compartment 14, and a trunk compartment 16. An engine 18 is positioned within the engine compartment 12. Engine 18 preferably operates using a compressed gaseous fuel such as hydrogen. Engine compartment 12 may also contain various other accessories for the automotive vehicle, which are not illustrated, and include such components as a radiator, battery, electrical distribution system, air conditioning, and a power steering pump. Air may be circulated throughout the engine compartment 12 and trunk compartment 16 through vents 20, 22. A suitable manner for venting may be found in co-pending application Ser. No. 09/682,951, which is incorporated by reference herein, using a ventilation fan.

Trunk compartment 16 may have a gaseous fuel distribution system 24 therein for routing the gaseous fuel to engine 18. Distribution system 24 includes a storage tank or tanks 26, a fuel line 28, vent line 30 and a control circuit 32. Storage tanks 26 are coupled to engine 18 through fuel line 28. Storage tanks 26 store compressed hydrogen fuel therein. Vent line 30 is coupled to a vent 34 such as a roof vent as illustrated.

Figure 2:
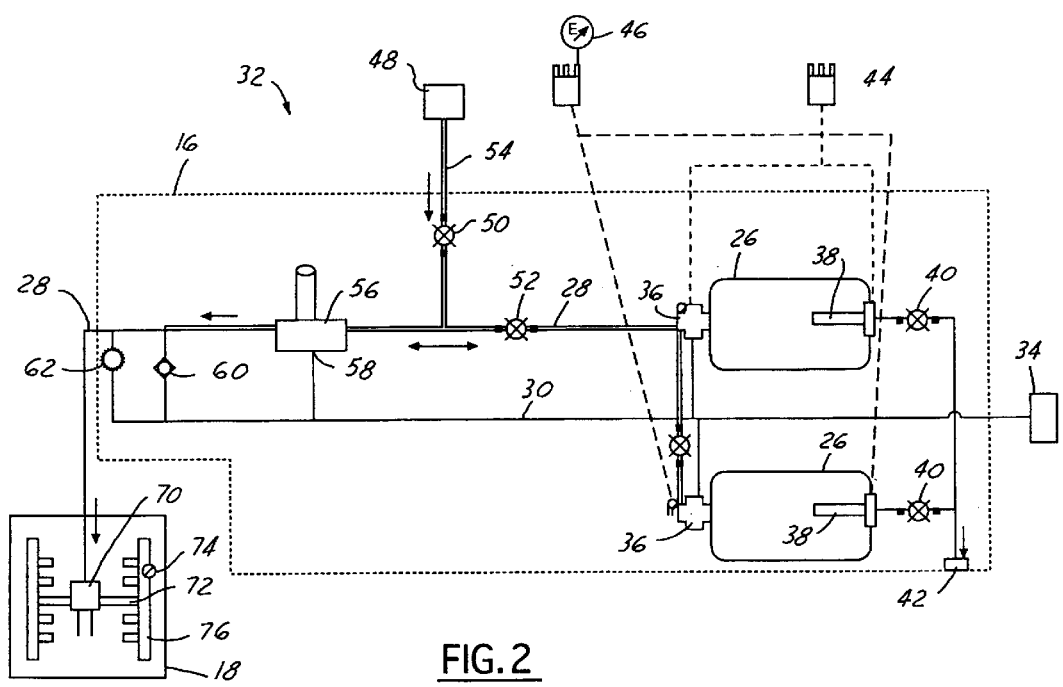
FIG. 2 is a schematic view of the ventilation system of FIG. 1.

Referring now to FIG. 2, gas distribution system 24 within trunk compartment 16 is illustrated in further detail. In this embodiment, two storage tanks 26 are illustrated that are coupled to fuel line 28 and to vent line 30 through a in-tank solenoid thermal pressure relief device 36. The number of tanks, of course, may vary depending on the particular application. An in-tank thermal pressure relief device 36 is provided for each tank. A temperature end cap with temperature probe 38 may also be included within the storage tank 26. The tank end cap with temperature probe 38 may be coupled to a valve 40 which connects to a quick connect coupling 42 for purging and defueling the tank during servicing. An electrical connector 44 may also be provided on the vehicle for monitoring in-tank pressure relief device 36 and for monitoring the amount of fuel using a fuel gauge 46. Upon the inoperability of in-tank thermal pressure relief device 36 or when desired, the tanks may be vented through vent line 30. Hydrogen gas may be stored in storage tanks 38 through a fill station 48 coupled to fuel line 28. Valves 50 and 52 may be provided in fill line 54.

A pressure regulator 56 may also be provided in fuel line 28. Preferably, pressure regulator 56 has a diaphragm actuated vent port 58 therein. Vent port 58 allows excess pressure to be routed back to vent line 30 and vented through roof 34 upon the presence of a high pressure within fuel line 28.

A pressure relief valve 60 is also coupled to fuel line 28 downstream of pressure regulator 56. Pressure relief valve in the present example is set to 125 psi. That is, when the pressure within fuel line 28 exceeds 125 psi, fuel is routed to vent line 30.

A burst disk 62 may also be coupled to fuel line 28. Burst disk 62 is similar to pressure relief valve 60 in that a burst pressure opens the disk and vents fuel through vent line 30 and vent 34. Burst disk 62 is preferably set at a substantially higher pressure than pressure relief valve. In the present example, a burst disk having 450 psi rating was used. Preferably, each of the above components is located within the trunk compartment 16 of the automotive vehicle. Engine 18 may have a fuel rail solenoid 70 coupled to flexible fuel rails 72 which provide the fuel to the engine. A pressure sensor 74 and fuel rail temperature sensor 76 may also be provided to provide feedback to a control system.

In operation, if any one or several of the devices such as the in-tank thermal pressure relief device 36, the pressure regulator 56, or the pressure relief valve 60 becomes inoperable the vent line 30 will receive the combustible fuel therefrom. If each of these three devices malfunctions, burst disk 62 will open and provide relief through vent line 30 so that engine 18 does not receive the full pressure of the storage tanks 26.

One advantage of the invention is thus evident in that a common vent line is used for all of the above-mentioned components which simplifies the combustible fuel plumbing in the automotive vehicle.

While particular embodiments of the invention have been shown and described, numerous variations and alternate embodiments will occur to those skilled in the art. Accordingly, it is intended that the invention be limited only in terms of the appended claims.

What is claimed is:

1. A ventilation system for an automotive vehicle having a combustible gaseous fuel source within said vehicle and an engine, said system comprising:
   a fuel line coupling said gas source to said engine;
   a vent;
   a vent line coupled to said vent;
   a pressure regulator coupled to said fuel line and said vent line;
   a pressure relief valve coupled to said fuel line and said vent line, and
   a burst disk pressure coupled to said fuel line;
   whereby upon inoperability of said pressure regulator or said relieve valve gaseous fuel is coupled to said vent line.

2. A ventilation system as recited In claim 1 wherein said vent comprises a roof vent.

3. A ventilation system as recited in claim 1 further comprising a burst disk coupled to said fuel line having a predetermined burst pressure.

4. A ventilation system as recited in claim 1 further comprising a thermal pressure relief device coupled to said fuel line and said vent line.

5. A ventilation system as recited in claim 4 wherein upon inoperability of said thermal pressure relief device, gaseous fuel is coupled to said vent line.

6. A ventilation system as recited in claim 1 wherein said combustible gas source comprises a hydrogen gas source and said combustible gas fuel comprises hydrogen.

7. An automotive vehicle comprising:
   an engine;
   a gaseous fuel source system coupled to said engine comprising,
   a combustible gaseous fuel source;
   said engine operating on combustible gaseous fuel;
   a fuel line coupling said gas source to said engine;
   a pressure regulator coupled to said fuel line;
   a pressure relief valve coupled to said fuel line; and
   a burst disk coupled to said fuel line; and
   a vent system comprising,
   a vent line coupled to said pressure regulator, said pressure relief valve and said burst disk, said vent line receiving gaseous fuel upon the inoperability of said pressure relief valve, said pressure regulator and said burst disk.

8. A ventilation system as recited in claim 7 wherein said vent comprises a roof vent.

9. A ventilation system as recited in claim 7 further comprising a burst disk coupled to said fuel line having a predetermined burst pressure.

10. A ventilation system as recited in claim 7 further comprising a thermal pressure relief device coupled to said fuel line and said vent line.

11. A ventilation system as recited in claim 10 wherein upon inoperability of said thermal pressure relief device, gaseous fuel is coupled to said vent line.

12. A method for operating a ventilation system for an automotive vehicle comprises:
   providing a gaseous fuel storage tank coupled to a fuel line;
   providing a regulator coupled between the fuel line and a vent line;
   providing a pressure relief valve coupled between the fuel line and a vent line; and
   upon inoperability of either the regulator or pressure relief valve, coupling gaseous fuel to said vent line;
   providing a thermal pressure relief device coupled to said vent line; and
   upon inoperability of said thermal pressure relief device, coupling gaseous fuel to said vent line.

13. A method for operating a ventilation system for an automotive vehicle comprises:
   providing a gaseous fuel storage tank coupled to a fuel line;
   providing a regulator coupled between the fuel line and a vent line;
   providing a pressure relief valve coupled between the fuel line and a vent line:
   upon inoperability of either the regulator or pressure relief valve, coupling gaseous fuel to said vent line;
   providing a burst disk coupled to said vent line; and
   coupling gaseous fuel to said vent line through said burst disk.

14. A method as recited in claim 13 wherein coupling gaseous fuel to said vent line through the burst disk is performed upon inoperability of the regulator and pressure relief valve.

* * * * *